(12) United States Patent
Han et al.

(10) Patent No.: US 7,848,091 B2
(45) Date of Patent: Dec. 7, 2010

(54) DUAL-SCREEN MOBILE DISPLAY DEVICE

(75) Inventors: Sang Kwuon Han, Gyeonggi-do (KR);
Woo Jong Lee, Gyeonggi-do (KR);
Hyun Tag Hong, Gyeonggi-do (KR);
Sung Won Ahn, Gyeonggi-do (KR);
Min Ju Kang, Gyeonggi-do (KR)

(73) Assignee: Samsung Mobile Display Co., Ltd., Yongin (KR)

( * ) Notice: Subject to any disclaimer, the term of this patent is extended or adjusted under 35 U.S.C. 154(b) by 935 days.

(21) Appl. No.: 11/687,602

(22) Filed: Mar. 16, 2007

(65) Prior Publication Data

US 2007/0285343 A1     Dec. 13, 2007

(30) Foreign Application Priority Data

Apr. 7, 2006   (KR) ............... 10-2006-0031924

(51) Int. Cl.
  *G06F 1/16*   (2006.01)
  *H05K 5/00*   (2006.01)
  *H05K 7/00*   (2006.01)

(52) U.S. Cl. ............................................. 361/679.26
(58) Field of Classification Search ............ 361/679.21, 361/679.26, 679.27, 679.29; 455/575.1, 455/575.4
See application file for complete search history.

(56) References Cited

U.S. PATENT DOCUMENTS 5,608,863 A * 3/1997 Ishizawa et al. ............. 345/501
5,768,096 A * 6/1998 Williams et al. ......... 361/679.04
5,923,307 A * 7/1999 Hogle, IV ........................ 345/4
6,151,401 A * 11/2000 Annaratone ................. 381/388
6,222,507 B1* 4/2001 Gouko ......................... 345/1.1
6,295,038 B1 9/2001 Rebeske ...................... 345/1.1
6,297,956 B1* 10/2001 Janik et al. ............. 361/679.47

(Continued)

FOREIGN PATENT DOCUMENTS

JP    2001-265264    9/2001
KR   10-2004-0104086   12/2004

OTHER PUBLICATIONS

Korean Patent Abstracts, Publication No. 1020040104086 A, Published on Dec. 10, 2004, in the name of Jung.

*Primary Examiner*—Jayprakash N Gandhi
*Assistant Examiner*—Adrian S Wilson
(74) *Attorney, Agent, or Firm*—Christie, Parker & Hale, LLP (57) ABSTRACT

A dual-screen mobile display device, which embodies a dual-screen display according to a user's selection. The dual-screen mobile display device for a mobile device includes an image signal supply part for supplying a first image signal and a second image signal. A first active matrix organic light emitting display panel displays the first image signal. A housing mounts the first active matrix organic light emitting display panel. A second active matrix organic light emitting display panel is adapted to be inserted in and pulled out from the housing and displays at least one of the first image signal or the second image signal. A moving mechanism moves the second active matrix organic light emitting display panel outside of the housing. A fixing part fixes the second active matrix organic light emitting display panel when the second active matrix organic light emitting display panel is moved outside of the housing.

18 Claims, 5 Drawing Sheets

U.S. PATENT DOCUMENTS

| | | | |
|---|---|---|---|
| 6,302,612 B1 * | 10/2001 | Fowler et al. | 403/76 |
| 6,327,482 B1 * | 12/2001 | Miyashita | 455/566 |
| 6,532,146 B1 * | 3/2003 | Duquette | 361/679.04 |
| 6,583,773 B1 * | 6/2003 | Nogami et al. | 345/7 |
| 6,630,937 B2 * | 10/2003 | Kallergi et al. | 345/619 |
| 6,643,124 B1 * | 11/2003 | Wilk | 361/679.04 |
| 6,643,127 B1 * | 11/2003 | Richardson | 361/679.4 |
| 6,667,877 B2 * | 12/2003 | Duquette | 361/679.04 |
| 6,778,383 B2 * | 8/2004 | Ho | 361/679.04 |
| 6,819,304 B2 * | 11/2004 | Branson | 345/1.3 |
| 6,844,865 B2 * | 1/2005 | Stasko | 345/1.3 |
| 6,859,219 B1 * | 2/2005 | Sall | 345/1.1 |
| 6,909,597 B2 * | 6/2005 | Tutikawa | 361/679.04 |
| 6,967,632 B1 * | 11/2005 | Minami et al. | 345/1.3 |
| 7,035,086 B2 * | 4/2006 | Williams et al. | 361/679.02 |
| 7,353,053 B2 * | 4/2008 | Prichard et al. | 455/575.4 |
| 7,636,591 B2 * | 12/2009 | Kim et al. | 455/575.4 |
| 2001/0054986 A1 * | 12/2001 | Leman | 345/1.1 |
| 2003/0006942 A1 * | 1/2003 | Searls et al. | 345/1.1 |
| 2003/0218577 A1 * | 11/2003 | Wang | 345/1.3 |
| 2004/0042163 A1 * | 3/2004 | Tutikawa | 361/683 |
| 2004/0125549 A1 * | 7/2004 | Iredale | 361/681 |
| 2005/0088463 A1 * | 4/2005 | Schilling | 345/699 |
| 2006/0044745 A1 * | 3/2006 | Kim | 361/681 |
| 2006/0109206 A1 * | 5/2006 | Kim | 345/60 |
| 2006/0187642 A1 * | 8/2006 | Jeong | 361/704 |
| 2006/0268500 A1 * | 11/2006 | Kuhn | 361/683 |
| 2007/0247798 A1 * | 10/2007 | Scott, II | 361/683 |

* cited by examiner

DUAL-SCREEN MOBILE DISPLAY DEVICE

CROSS-REFERENCE TO RELATED APPLICATIONS

This application claims priority to and the benefit of Korean Patent Application No. 10-2006-0031924, filed on Apr. 7, 2006, in the Korean Intellectual Property Office, the entire content of which is incorporated herein by reference.

BACKGROUND

1. Field of the Invention

The present invention relates to a display device used for a mobile device such as a notebook computer or a portable information terminal, and more particularly, to a dual-screen mobile display device, which embodies a dual-screen display according to a user's selection.

2. Discussion of Related Art

With the widespread availability of mobile devices such as portable telephones and notebook computers, many people are using such mobile devices. To enhance portability of such mobile devices, they have been designed to be small, slim, and lightweight. Accordingly, components mounted in the mobile devices have been small and semiconductor-based.

However, in spite of a trend to produce smaller mobile devices, there is a demand for a larger-sized screen in a display device mounted in the mobile device so that a user can more easily view the displayed images.

Flat panel displays have been widely used as an example of the display device mounted in the mobile device. Since the flat panel display is thinner compared to a CRT display device and because it consumes less electricity, flat panel displays are suitable for applications in mobile devices.

Recently, with developments in communication technology, bandwidth of mobile devices has rapidly increased. Accordingly, a user can exchange a large amount of data through a wireless network and view multi-media contents such as moving images using the mobile device. However, in spite of a diversity of viewable contents, the conventional mobile device cannot provide a larger screen due to a design emphasis on size reduction or minimization.

That is, since the display device mounted in the mobile device cannot be larger in size than a size of the mobile device itself, there is a limit to a degree to which the screen can be enlarged.

Furthermore, an additional display device that is used separately from the mobile device can embody a display with a large screen, but such an additional display device does not enhance portability. Moreover, the additional display device increases manufacturing costs.

SUMMARY OF THE INVENTION

An aspect of the present invention provides a dual-screen mobile display device, which may embody a single screen or a dual screen display according to a user's selection.

In one embodiment, a dual-screen mobile display device for a mobile device includes an image signal supply part for supplying a first image signal and a second image signal. A first active matrix organic light emitting display panel displays the first image signal. The first active matrix organic light emitting display panel is mounted on a housing. A second active matrix organic light emitting display panel is adapted to be inserted in and pulled out from the housing and displays at least one of the first image signal or the second image signal. A moving mechanism moves the second active matrix organic light emitting display panel outside of the housing. A fixing part fixes the second active matrix organic light emitting display panel when the second active matrix organic light emitting display panel is moved outside of the housing.

BRIEF DESCRIPTION OF THE DRAWINGS

These and/or other aspects and features of the invention will become apparent and more readily appreciated from the following description of exemplary embodiments, taken in conjunction with the accompanying drawings of which.

DETAILED DESCRIPTION

The present invention relates to a display device used for a mobile device such as a notebook computer or a portable information terminal. By way of example, embodiments of the present invention are described with respect to a notebook computer. However, embodiments of the present invention are not limited thereto.

Hereinafter, exemplary embodiments of the present invention will be described with reference to the accompanying drawings. Here, when a first element is described as being connected to a second element, the first element may be not only directly connected to the second element but may also be indirectly connected to the second element via a third element. Further, elements that are not essential to the complete understanding of the embodiments are not shown to improve clarity. Also, like reference numerals refer to like elements throughout.

Figure 1A:
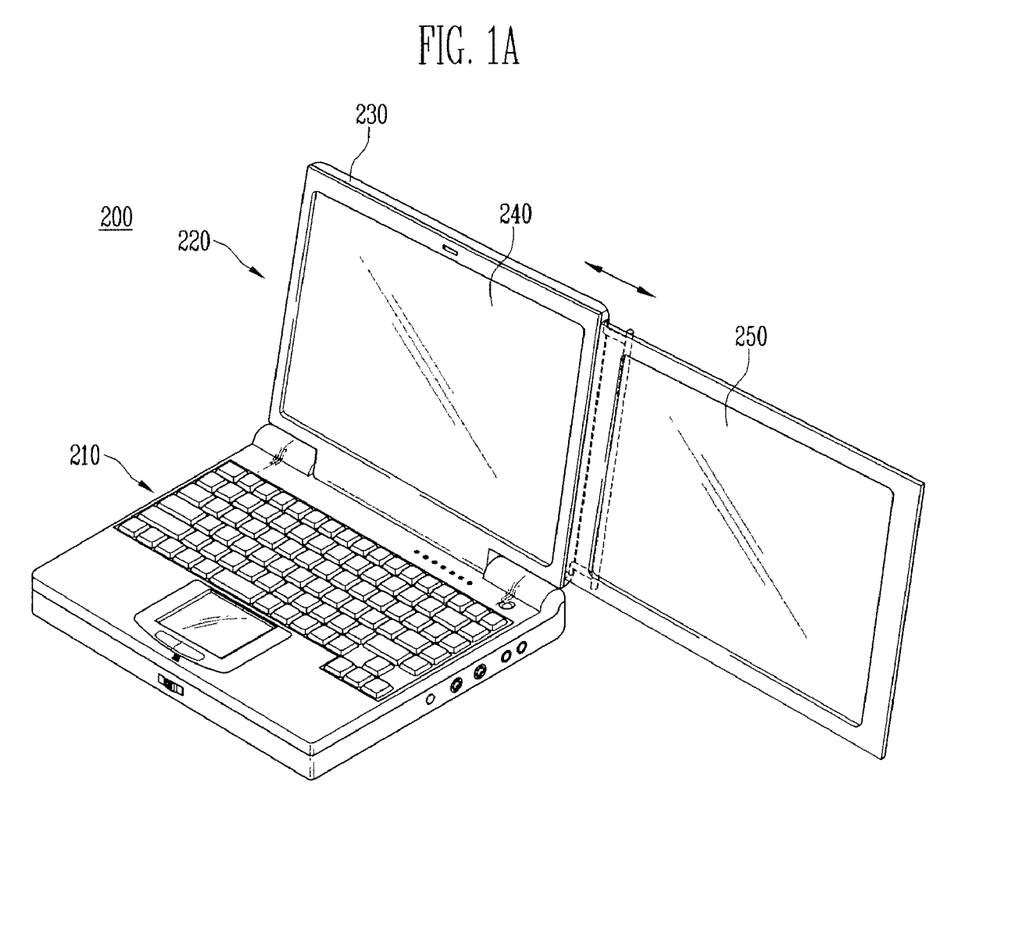
FIG. 1A is an engaged perspective view showing a dual-screen mobile display device according to a first embodiment of the present invention.
Figures 1B, 1C:
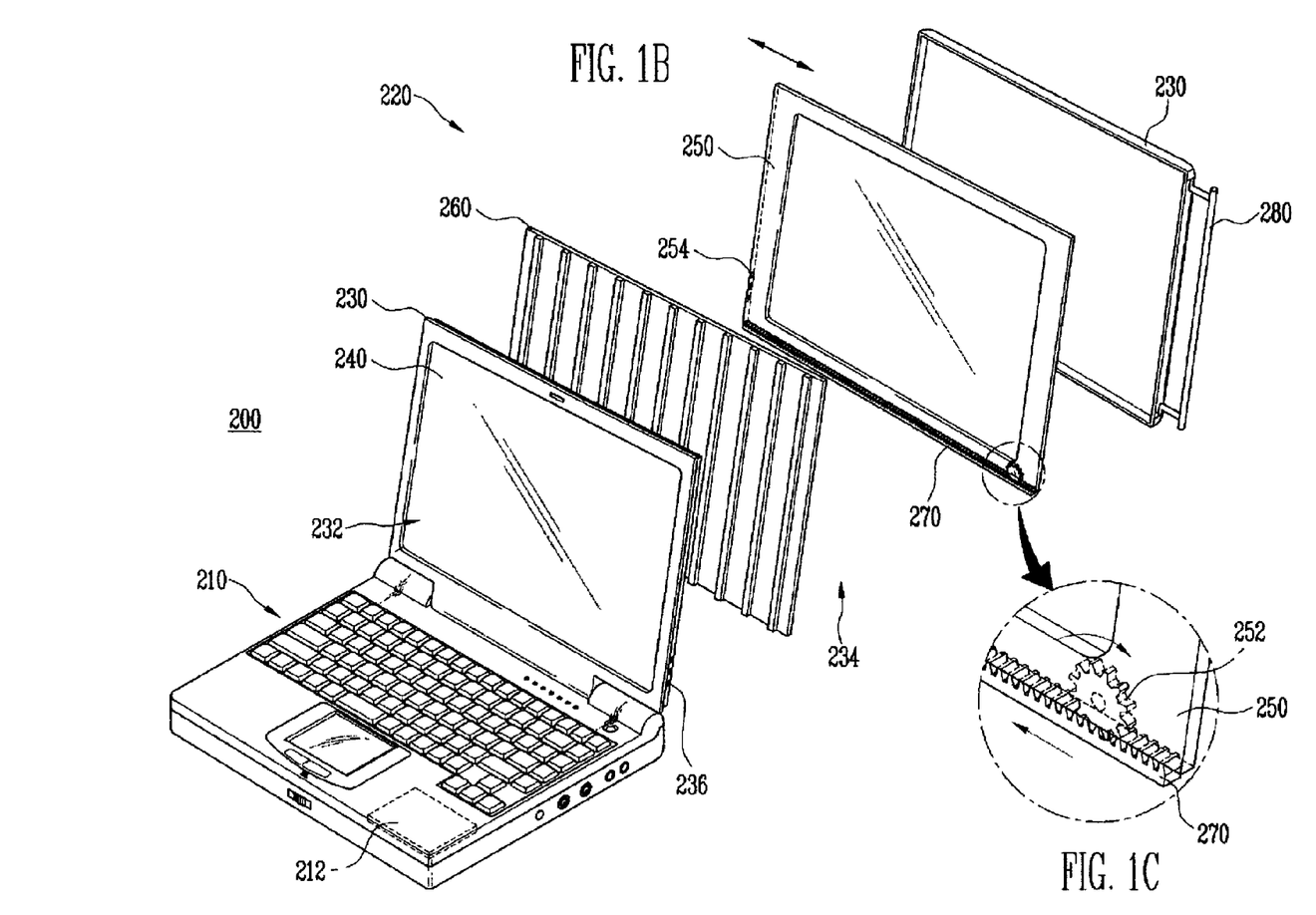
FIG. 1B is an exploded perspective view showing the dual-screen mobile display device according to the first embodiment of the present invention.
FIG. 1C is an enlarged view of a moving mechanism of FIG. 1B.

FIG. 1A is an engaged perspective view showing a dual-screen mobile display device according to a first embodiment of the present invention. FIG. 1B is an exploded perspective view showing the dual-screen mobile display device according to the first embodiment of the present invention.

The dual-screen mobile display device according to the first embodiment of the present invention is shown as a dual-screen mobile display device 220, which is installed (or located) at a mobile device 200. As shown in FIG. 1A, FIG. 1B and FIG. 1C, the dual-screen mobile display device 220 includes first and second active matrix organic light emitting display panels 240 and 250. The second active matrix organic light emitting display panel 250 can be inserted in and pulled out from a housing 230 to which the first active matrix organic light emitting display panel 240 is mounted, so that one or plural screens may be viewed according to a user's selection.

In more detail, the dual-screen mobile display device 220 according to the first embodiment of the present invention includes an image signal supply part 212, the first active matrix organic light emitting display panel 240, the second active matrix organic light emitting display panel 250, a moving mechanism 270, and a fixing part 280. The image signal supply part 212 generates and/or supplies at least a first image signal and a second image signal. The first active matrix organic light emitting display panel 240 displays the first image signal from the image signal supply part 212. The second active matrix organic light emitting display panel 250 can be inserted in and pulled out from the housing 230 to which the first active matrix organic light emitting display panel 240 is mounted. The second active matrix organic light emitting display panel 250 displays at least one of the first image signal or the second image signal from the image signal supply part 212. The moving mechanism 270 moves the second active matrix organic light emitting display panel 250 outside of the housing 230. The fixing part 280 fixes the second active matrix organic light emitting display panel 250 when it is moved outside of the housing 230.

Furthermore, the dual-screen mobile display device 220 includes a dividing plate 260 positioned in the housing 230 in order to prevent a rear surface of the first active matrix organic light emitting display panel 240 from directly contacting the second active matrix organic light emitting display panel 250 when the second active matrix organic light emitting display panel 250 is inserted in the housing 230.

The dividing plate 260 is interposed between the first active matrix organic light emitting display panel 240 and the second active matrix organic light emitting display panel 250. The dividing plate 260 may be formed of one or more plastic materials. To prevent (or reduce) thermal damage to the first active matrix organic light emitting display panel 240 and/or the second active matrix organic light emitting display panel 250, the dividing plate 260 may include a heat sink having an uneven surface for dissipating heat from the first active matrix organic light emitting display panel to outside.

The dividing plate may further include a shock absorbing tape and/or a sponge including one or more porous materials. By way of example, the sponge may include a rubber type sponge formed of a foamed natural rubber and/or a urethane type sponge formed of synthetic resins.

The shock absorbing tape and/or the sponge including porous materials can be formed (or located) on the dividing plate 260, which performs a radiating function. By way of example, the shock absorbing tape and the sponge including porous materials can be placed on the dividing plate 260.

In addition, the housing 230 couples and engages the dual-screen mobile display device 220 with a body 210 of the mobile device 200. The first active matrix organic light emitting display panel 240 is fixed to the housing 230 such that a user may view it through a front opening portion 232 of the housing 230. The second active matrix organic light emitting display panel 250 is detachably inserted in the housing 230.

In the embodiment shown in FIGS. 1A and 1B, an opening 234 is formed (or defined) at a right side of the housing 230 such that the second active matrix organic light emitting display panel 250 may be pulled out toward a right side of the housing 230. When the second active matrix organic light emitting display panel 250 is inserted in the housing 230, it is positioned at a rear side of (i.e., behind) the first active matrix organic light emitting display panel 240. In contrast, when the second active matrix organic light emitting display panel 250 is pulled out from the housing 230 through the opening 234, it is positioned at a right side of the first active matrix organic light emitting display panel 240.

That is, when the second active matrix organic light emitting display panel 250 is inserted in the housing 230, the first active matrix organic light emitting display panel 240 embodies a single screen display. In contrast, when the second active matrix organic light emitting display panel 250 is pulled out from the housing 230 through the opening 234, the first and second active matrix organic light emitting display panels 240 and 250 embody a dual screen display.

Each of the first and second active matrix organic light emitting display panels 240 and 250 displays an image signal provided from the image signal supply part 212, which supplies at least one image signal. The first and second active matrix organic light emitting display panels 240 and 250 provide a single display or a dual display mode of operation according to a user's selection.

In more detail, when a user selects the single display mode, because the second active matrix organic light emitting display panel 250 is inserted in the housing 230, it does not perform a display operation. Only the first active matrix organic light emitting display panel 240 performs a display operation to embody the single screen display. In contrast, when the user selects the dual display mode, the second active matrix organic light emitting display panel 250 is pulled out from the housing 230 through the opening 234, such that a dual screen display is embodied by the first and second active matrix organic light emitting display panels 240 and 250 (i.e., each of the first and second active matrix organic light emitting display panels 240 and 250 performs a display operation).

To do this, the second active matrix organic light emitting display panel 250 includes a signal transfer section 254 for receiving an image signal (which may be predetermined) from the image signal supply part 212 only when the second active matrix organic light emitting display panel 250 is pulled out to outside the housing 230.

That is, when the second active matrix organic light emitting display panel 250 is pulled out to outside of the housing 230, the signal transfer section 254 receives the image signal (which may be predetermined) from the image signal supply part 212.

As shown in FIG. 1B, the signal transfer section 254 is installed at a side of the second active matrix organic light emitting display panel 250. When the second active matrix organic light emitting display panel 250 is pulled out completely (or substantially) outside of the housing 230, the signal transfer section 254 becomes electrically coupled with a signal transfer pad 236, which is formed at an outer side wall of the housing 230, and can then receive the image signal from the image signal supply part 212 via the signal transfer pad 236.

The signal transfer section 254 transfers image signal data of the image signal to a driving circuit, which is installed at the second active matrix organic light emitting display panel 250.

The image signal supply part 212 may use low voltage differential signaling (LVDS) to transmit image signals. Moreover, the image signal supply part 212 may include a noise filter to prevent (or reduce the occurrence of) a distortion phenomenon during transmission of an image signal.

In addition, the second active matrix organic light emitting display panel 250 may receive an image signal the same as (or substantially the same as) or different from that provided to the first active matrix organic light emitting display panel 240. In one embodiment, when the second active matrix organic light emitting display panel 250 receives the same image signal, a wide screen is embodied by the first and second active matrix organic light emitting display panels 240 and 250 as an integrated screen. In contrast, when the second active matrix organic light emitting display panel 250 receives a different image signal, the first active matrix organic light emitting display panel 240 may be used as a main screen, and the second active matrix organic light emitting display panel 250 may be used as a secondary screen.

The image signal supply part 212 may include an additional supply source to generate and/or supply at least one individual image signal. By way of example, in a mobile device such as the notebook computer shown in FIG. 1A, at least one video card installed at the body 210 of the notebook computer can be used as the additional supply source.

Also by way of example, when the mobile device is a cellular phone, at least one video chip can transmit a signal to the first and/or second active matrix organic light emitting display panels.

The moving mechanism 270 is installed at the housing 230, and is for moving the second active matrix organic light emitting display panel 250 outside of the housing 230 by an automatic and/or manual operation. When the second active matrix organic light emitting display panel 250 is moved outside of the housing 230, it is fixed to the outer side wall of the housing 230 by the fixing part 280.

As shown in FIGS. 1B and 1C, a gear belt can be used as an example of the moving mechanism 270, which is installed at an inner lower portion of the housing 230. The gear belt engages with a gear 252 which is disposed at a lower side of the second active matrix organic light emitting display panel 250 to move the second active matrix organic light emitting display panel 250 according to a user's selection.

Here, the gear belt 270 may be operated by a driving mechanism such as a motor. In this case, a user controls the motor to insert or pull the second active matrix organic light emitting display panel 250 in or out from the housing, respectively.

Moreover, the fixing part 280 fixes the second active matrix organic light emitting display panel 250 when it is moved outside of the housing 230.

So that a substantially uneven level is not formed between the second active matrix organic light emitting display panel 250 (pulled out to outside of the housing 230) and the first active matrix organic light emitting display panel 240, as shown in FIG. 1A, the fixing part 280 fixes the second active matrix organic light emitting display panel 250 to the side outer wall of the housing 230 on which the opening 234 is formed, such that the second active matrix organic light emitting display panel 250 is positioned substantially level with a front surface of the housing 230.

Although the aforementioned moving mechanism 270 and the fixing part 280 are described according to one embodiment, it would be appreciated by those skilled in the art that they can be embodied in various suitable forms.

In an embodiment of the present invention, an active matrix organic light emitting display panel is used as a panel for displaying an image.

An organic light emitting display panel is a self-emission device that emits light using fluorescent materials by recombining electrons and holes. Since the organic light emitting display panel, similar to the CRT, has a high response speed compared with a passive electroluminescent device that requires an additional light source such as an LCD, and does not require a backlight unit having an additional light source, the organic light emitting display panel is typically significantly thinner. To enhance portability of such mobile devices, they have been designed to be small, slim, and lightweight. When this trend is to be followed and enlargement of the display device is concurrently desired, a display device using a passive electroluminescent device such as the aforementioned LCD cannot easily be designed to be slim and lightweight. Accordingly, it is difficult to apply a passive electroluminescent device to the present invention.

The organic light emitting display panel can be categorized as a passive matrix organic light emitting display panel or an active matrix organic light emitting display panel according to its drive type. In conventional devices, the passive matrix organic light emitting display panel has been mounted and used as a secondary display of a portable device. However, since a significant deterioration occurs in an emission layer of the passive matrix organic light emitting display panel and power consumption is great in the passive matrix organic light emitting display panel, it is difficult to apply the passive matrix organic light emitting display panel to a panel of larger area and high resolution. Therefore, the active matrix organic light emitting display panel is more suitable for application to manufacture and operation of a light emitting display panel having a large area and high resolution.

Accordingly, a dual-screen mobile display device in embodiments of the present invention includes an active matrix organic light emitting display panel.

Hereinafter, a detailed arrangement of the first and second organic light emitting displays shown in FIGS. 1A to 1C will be explained with reference to FIG. 2 and FIG. 3.

Figure 2:
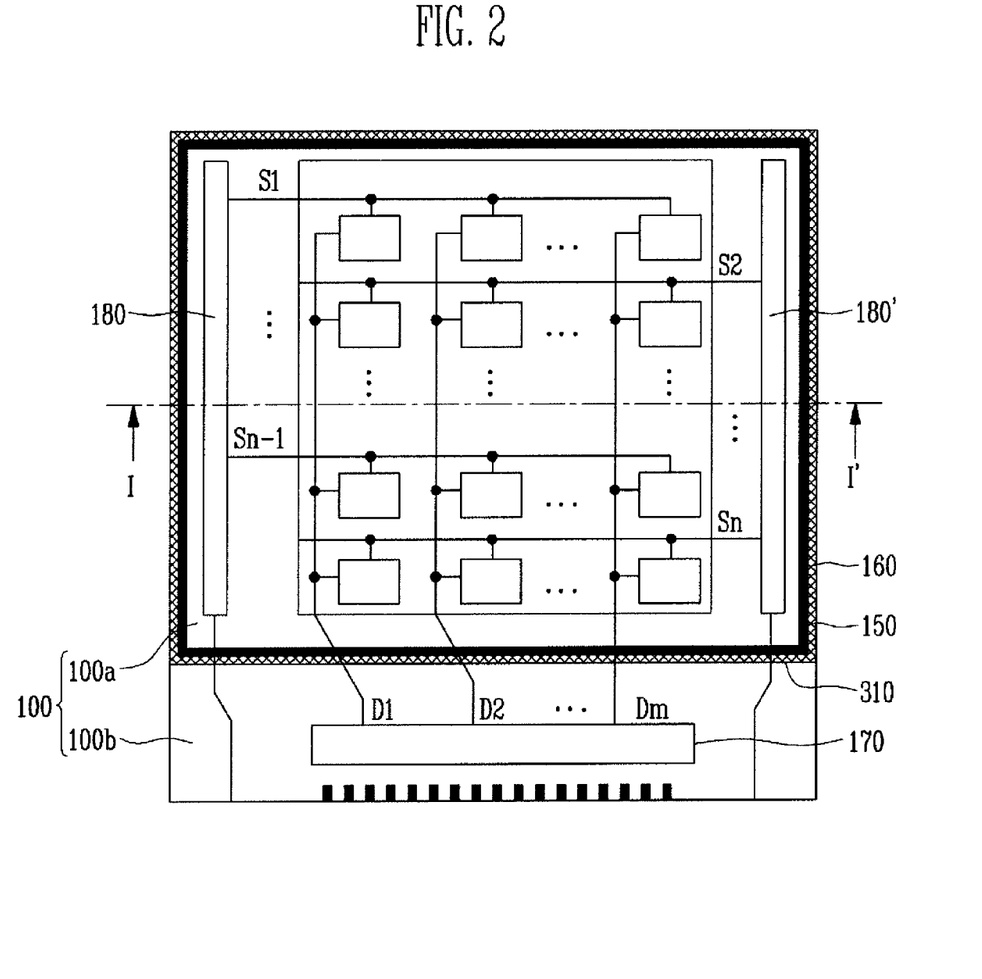
FIG. 2 is a block diagram showing a construction of an active matrix organic light emitting display panel shown in FIG. 1A and FIG. 1B.

FIG. 2 is a block diagram showing a construction of the active matrix organic light emitting display panel shown in FIG. 1A to FIG. 1C. FIG. 3 is a sectional view of the active matrix organic light emitting display panel in FIG. 2 taken along a line I-I'.

Figure 3:
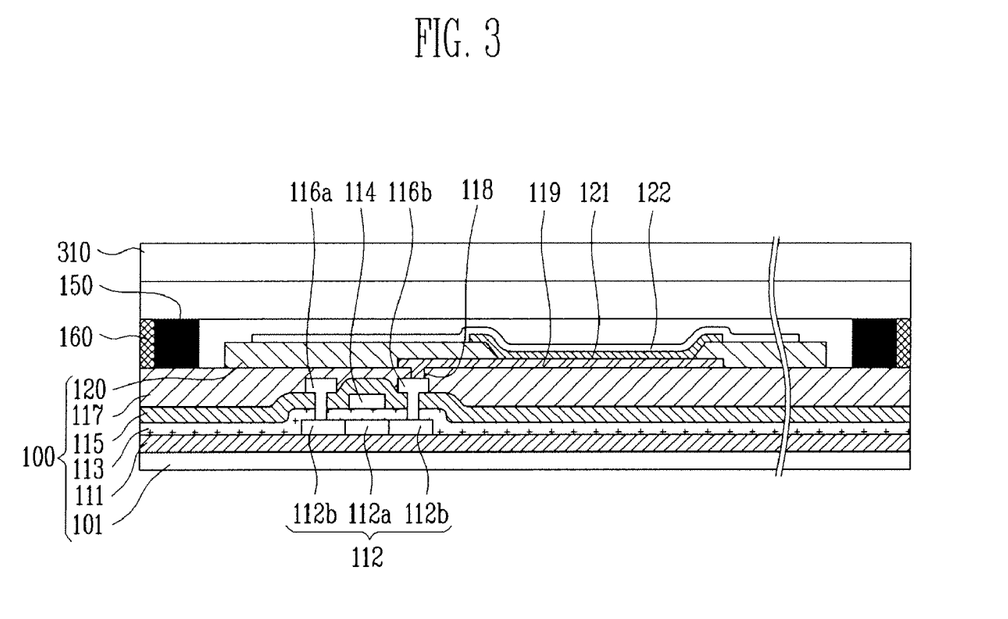
FIG. 3 is a sectional view of the active matrix organic light emitting display panel in FIG. 2 taken along a line I-I'.

However, the active matrix organic light emitting display panel of FIG. 2 and FIG. 3 is described only as an embodiment of an organic light emitting display panel of the present invention. Therefore, a construction of the organic light emitting panel of the present invention is not limited thereto.

Referring to FIG. 2 and FIG. 3, the active matrix organic light emitting display panel includes a substrate 100, a sealing substrate 310, a frit 150, and a reinforcing member 160. For purposes of description, the substrate 100 includes organic light emitting diodes. A deposition (or base) substrate 101 is located below an upper portion of the substrate 100 at which the organic light emitting diodes are located.

The substrate 100 includes a pixel region 100a and a non-pixel region 100b. A plurality of organic light emitting diodes are formed at the pixel region 100a. Each organic light emitting diode includes a first electrode 119, an organic layer 121, and a second electrode layer 122. The pixel region 100a is a region on which a certain (e.g., predetermined) image is displayed due to light emitted from the organic light emitting diodes. The non-pixel region 100b includes all regions on the substrate 100 except for the pixel region 100a.

The pixel region 100a includes a plurality of scan lines S1 to Sn arranged in rows and a plurality of data lines D1 to Dm arranged in columns. The pixel region 100a also includes scan drivers 180 and 180'. A plurality of pixels are electrically coupled to the scan lines S1 to Sn and the data lines D1 to Dm, and receive a signal to drive a corresponding organic light emitting diode from a data driver 170 of a driver IC.

The data driver 170 and metal wirings are formed at the non-pixel region 100b. The driver IC drives the organic light emitting diodes. The metal wirings are electrically connected to the scan lines S1 to Sn and the data lines D1 to Dm. In the embodiment shown in FIG. 2, the driver IC includes the data driver 170 and the scan drivers 180 and 180'.

In the described embodiment, the organic light emitting diodes are driven by an active matrix method. The structure of the organic light emitting diode is described in more detail in reference to FIG. 3.

As shown in FIG. 3, a buffer layer 111 is formed on the base substrate 101 and prevents the substrate 100 from being damaged due to external heat. The buffer layer 111 is formed of an insulation material such as silicon oxide $SiO_2$ and/or silicon nitride $SiN_x$.

In addition, a semiconductor layer 112 is formed on at least one region of the buffer layer 111, and includes an active layer 112a and ohmic contact layers 112b. A gate insulation layer 113 is formed on the semiconductor layer 112 and the buffer layer 111. A gate electrode 114 is formed on one region of the gate insulation layer 113, and has a size corresponding to a width of the active layer 112a.

An interlayer insulation layer 115 is formed on the gate insulation layer 113 and on the gate electrode 114. Source and drain electrodes 116a and 116b are formed on a region (which may be predetermined) of the interlayer insulation layer 115.

The source and drain electrodes 116a and 116b are each positioned to be in contact with one exposed region of one of the ohmic contact layers 112b. A planarization layer 117 is formed on the interlayer insulation layer 115 and on the source and drain electrodes 116a and 116b.

The first electrode 119 is formed on one region of the planarization layer 117. Here, the first electrode 119 contacts an exposed region of the source electrode 116a or the drain electrode 116b.

Furthermore, a pixel definition film 120 is formed on the planarization layer 117 and the first electrode 119. The pixel definition film 120 includes an opening portion for exposing at least one region of the first electrode 119. The organic layer 121 is formed at the opening portion of the pixel definition film 120. The second electrode layer 122 is formed on the pixel definition film 120 and the organic layer 121. Here, a passivation layer may be formed on the second electrode layer 122.

Here, the organic layer 121 is disposed between the first electrode 119 and the second electrode layer 122. The organic layer 121 includes an organic emission layer, and can emit light by using an energy discharged by an exciton (e.g., an electron-hole pair) that is generated when a hole and an electron, which are introduced from two opposite electrodes, are injected to an organic light emitting layer. When the exciton falls down to a lower energy level, light is emitted.

The exciton can be categorized as a singlet exciton or a triplet exciton according to a spin engagement form. A probability of a formation of the singlet exciton is ¼, and a probability of a formation of the triplet exciton is ¾.

In general, since a base state of an organic molecule is a singlet state, the exciton changes to a base state to emit light using the singlet exciton. This is referred to as 'fluorescence'. An organic light emitting diode using such an organic molecule is a fluorescent organic light emitting diode.

However, since it is prohibited for the triplet exciton to change to a base state of a singlet state to emit light, 75% of the excitons are wasted. Accordingly, by using a phosphor dopant having a large spin-orbit combination, the exciton changes from the triplet state to a base state to emit light. This is referred to as 'phosphorescence'. An organic light emitting diode using such an organic molecule is a phosphorescent organic light emitting diode.

One of the fluorescent or the phosphorescent organic light emitting diodes is employed as the organic light emitting diode in one embodiment of the present invention.

In addition, the sealing substrate 310 seals at least the pixel region 100a of the substrate, on which the organic light emitting diode is formed. In a case of top-emission or double-side-emission, the sealing substrate 310 is formed of one or more transparent materials in one embodiment. In a case of bottom-emission, the sealing substrate 310 is formed of one or more opaque materials in one embodiment. The sealing substrate 310 may be formed of one or more glass materials, but the sealing substrate 310 is not limited thereto.

In one embodiment, the sealing substrate 310 has a shape of a plate, and seals at least the pixel region 100a of the substrate 100 on which the organic light emitting diodes are formed. In one embodiment, the sealing substrate 310 seals all regions of the substrate 100 except for a data driver and a pad portion.

The frit 150 is formed between the sealing substrate 310 and the non-pixel region 100b of the substrate 100. The frit 150 seals the pixel region 100a to intercept external air penetrating therein. In embodiments of the present invention, one or more glass materials in a form of a powder having adhesives or melted glass may form the frit 150. In one embodiment, both adhesives and melted glass can be used to form the frit 150.

The frit 150 forms a closed curve from an edge of an adhered surface of the substrate 100 and the sealing substrate 310 at an interval (which may be predetermined). The frit 150 includes a glass material, an absorbent, and a filler. The absorbent absorbs a laser, and the filler reduces a coefficient of thermal expansion. After the sealing substrate is coated with a frit paste, and the frit is melted between the substrate 100 and the sealing substrate 310 by laser and/or infrared rays, it is cured to seal the substrate 100 and the sealing substrate 310.

In one embodiment, the absorbent includes chemical compounds such as $V_2O_5$ having a transition metal.

Here, a formation line of the frit 150 may be from about 0.5 to about 1.5 mm in width. When the formation line of the frit 150 is less than about 0.5 mm in width, in one embodiment, the frit may have ineffective adhesive properties. A dead space of a device is increased when the formation line of the frit 150 is greater than about 1.5 mm in width in this embodiment.

In one embodiment, a thickness of the frit 150 is from about 10 to about 20 μm. When the thickness of the frit 150 is greater than about 20 μm, a large amount of energy may be required to seal a large amount of the frit during a laser sealing. Here, a power of a laser should be increased or a scan speed should be lowered. As a result, heat loss can occur. In addition, an undesirable frit coating state can occur when the thickness of the frit 150 is less than about 10 μm, according to one embodiment.

In one embodiment, a surface of a substrate 100 with which the frit directly contacts does not overlap with the metal wirings except for a section of the metal wirings with which the driver IC directly contacts. However, the present invention is not limited thereto. The metal wirings can be damaged when the metal wirings overlap with the frit 150 in a case where laser and/or infrared rays are irradiated to the frit 150.

The reinforcing member 160 is formed at a side portion of a periphery of the frit 150 to prevent an organic light emitting display from being broken when the substrate 100, the sealing substrate 310, and the frit 150 are all made of glass. When the frit 150 is melted, it is not adhered or has a low adhesive force. In this case, the reinforcing member 160 functions as a sealing material. The reinforcing member 160 either is spaced apart from the frit 150 by a distance (which may be predetermined) or contacts the frit 150.

Resins that are liquefied, coated, and natural-cured, heat-cured, and/or UV-cured, can be used as materials to form the reinforcing member 160. Acrylate cyanide can be used as a natural-cured material, acrylate can be used as a heat-cured material at a temperature less than about 80° C., and epoxy, acrylate, and/or acrylate urethane can be used as UV-cured materials.

Figure 4:
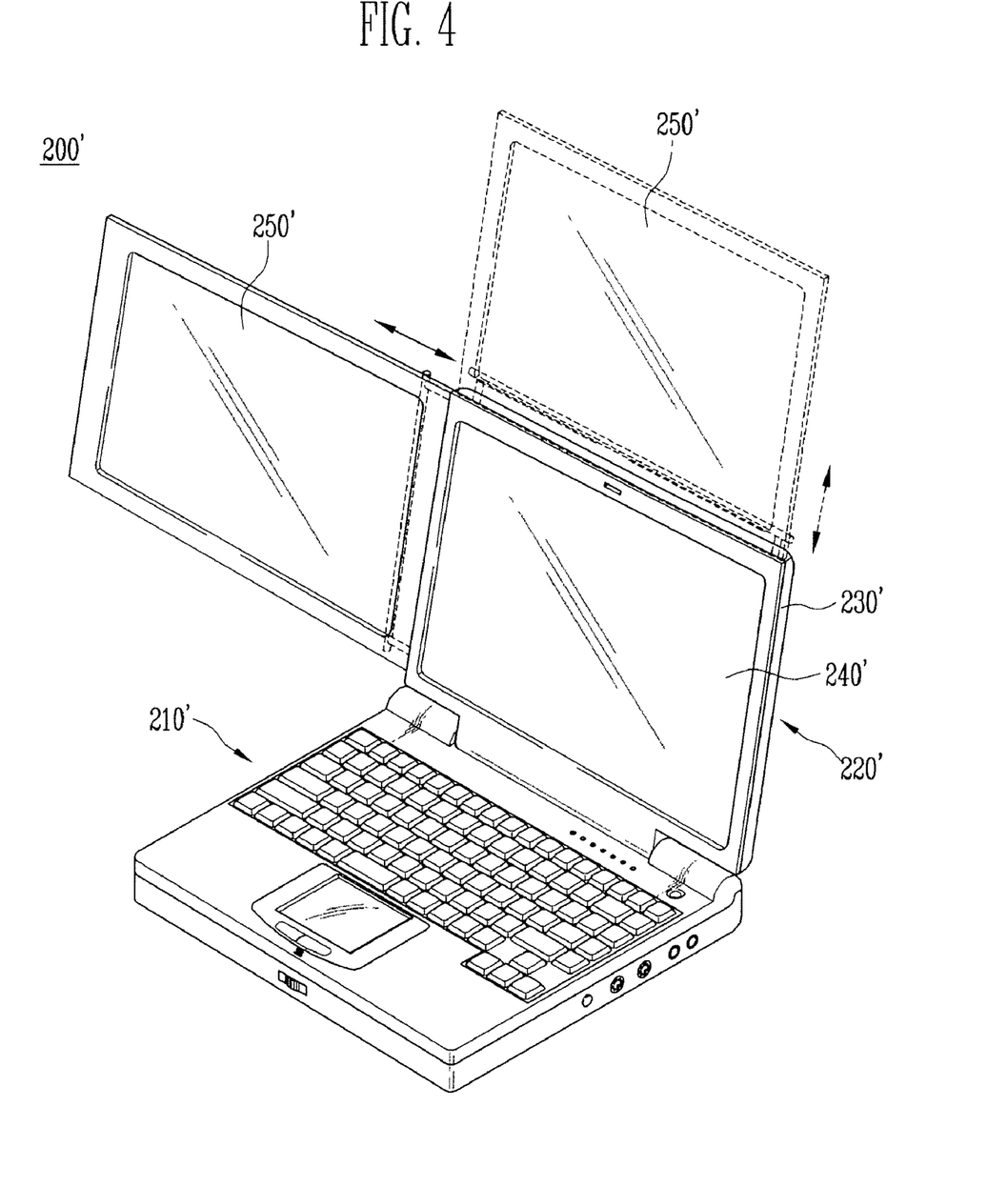
FIG. 4 is an engaged perspective view showing a dual-screen mobile display device according to a second embodiment of the present invention.

FIG. 4 is an engaged perspective view showing a dual-screen mobile display device according to a second embodiment of the present invention.

With reference to FIG. 4, the second embodiment has substantially the same construction and functions as those of the first embodiment. A difference is that the second active matrix organic light emitting display panel insertable in the housing can be pulled out towards an upper side and/or a left side of the housing and/or towards a right side thereof.

The dual-screen mobile display device 220' of FIG. 4, which is installed at a mobile device 200', includes a housing 230' and first and second active matrix organic light emitting display panels 240' and 250' that are substantially the same as the corresponding components of FIGS. 1A and 1B. Therefore, they will not be described in detail. The mobile device 200' includes a body 210' that is substantially the same as the corresponding component of FIGS. 1A and 1B. Therefore, this will not be described in detail.

As described above, in the present invention, in the mobile device such as a notebook computer, a dual screen display can be embodied without adding an external device. Since the second active matrix organic light emitting display panel is received in the housing in a sliding manner, a user can easily operate it. Because a plurality of display panels may be stored in a body of one mobile device, a work space is reduced, thereby lowering additional costs.

Further, since an organic light emitting display panel is used to embody a dual screen display, embodiments of the present invention can provide a large (or larger) screen and concurrently meet requirements of a current trend in which mobile devices are designed to be slim and lightweight.

Although a few embodiments of the present invention have been shown and described, it would be appreciated by those skilled in the art that changes might be made in these embodiments without departing from the principles and spirit of the invention, the scope of which is defined in the claims and their equivalents.

What is claimed is:

1. A dual-screen mobile display device for a mobile device, the dual-screen mobile display device comprising:
    image signal supply means for supplying a first image signal and a second image signal;
    a first active matrix organic light emitting display panel for displaying the first image signal;
    a housing comprising a signal transfer pad, the housing for mounting the first active matrix organic light emitting display panel;
    a second active matrix organic light emitting display panel comprising a signal transfer section and adapted to be inserted in and pulled out from the housing, the second active matrix organic light emitting display panel for displaying at least one of the first image signal or the second image signal;
    moving means for moving the second active matrix organic light emitting display panel outside of the housing; and
    fixing means for fixing the second active matrix organic light emitting display panel when the second active matrix organic light emitting display panel is moved outside of the housing, wherein the signal transfer pad is configured to transfer the first image signal or the second image signal from the image signal supply means to the signal transfer section, and
    wherein the signal transfer section is configured to be coupled with the signal transfer pad to receive the first image signal or the second image signal when the second active matrix organic light emitting display panel is pulled substantially outside of the housing, and to be decoupled from the signal transfer pad when the second active matrix organic light emitting display panel is inside the housing.

2. The dual-screen mobile display device according to claim 1, further comprising a dividing plate located in the housing, the dividing plate for preventing a rear surface of the first active matrix organic light emitting display panel from directly contacting the second active matrix organic light emitting display panel.

3. The dual-screen mobile display device according to claim 2, wherein the dividing plate comprises a heat sink having an uneven surface for dissipating heat from the first active matrix organic light emitting display panel to outside.

4. The dual-screen mobile display device according to claim 3, wherein the dividing plate further comprises shock absorbing tape and a sponge including porous materials.

5. The dual-screen mobile display device according to claim 1, wherein the housing couples and engages the display device with a body of the mobile device, and wherein the housing has a front opening portion and a side opening.

6. The dual-screen mobile display device according to claim 5, wherein the first active matrix organic light emitting display panel is fixed and located at the front opening portion of the housing.

7. The dual-screen mobile display device according to claim 5, wherein the second active matrix organic light emitting display panel is detachably inserted in the housing through the side opening.

8. The dual-screen mobile display device according to claim 1, wherein the image signal supply means includes an additional supply source for supplying at least one individual image signal.

9. The dual-screen mobile display device according to claim 8, wherein the additional supply source comprises at least one video card located at a body of the mobile device.

10. The dual-screen mobile display device according to claim 1, wherein the mobile device is a notebook computer.

11. The dual-screen mobile display device according to claim 1, wherein the moving means comprises a gear belt located at an inner lower portion of the housing, the gear belt being for engaging with a gear disposed at a lower side of the second active matrix organic light emitting display panel to move the second active matrix organic light emitting display panel.

12. The dual-screen mobile display device according to claim 1, wherein the second active matrix organic light emitting display device is adapted to be inserted in and pulled out from a right side of the housing.

13. The dual-screen mobile display device according to claim 12, wherein the second active matrix organic light emitting display device is further adapted to be inserted in and pulled out from a top side of the housing.

14. The dual-screen mobile display device according to claim 1, wherein the second active matrix organic light emitting display device is adapted to be inserted in and pulled out from a left side of the housing.

15. The dual-screen mobile display device according to claim 14, wherein the second active matrix organic light emitting display device is further adapted to be inserted in and pulled out from a top side of the housing.

16. A mobile device comprising:
    image signal supply means for supplying a first image signal and a second image signal;

a first active matrix organic light emitting display panel for displaying the first image signal;

a housing comprising a signal transfer pad, the housing for mounting the first active matrix organic light emitting display panel;

a second active matrix organic light emitting display panel comprising a signal transfer section and adapted to be inserted in and pulled out from the housing, the second active matrix organic light emitting display panel for displaying at least one of the first image signal or the second image signal;

moving means for moving the second active matrix organic light emitting display panel outside of the housing; and fixing means for fixing the second active matrix organic light emitting display panel when the second active matrix organic light emitting display panel is moved outside of the housing, wherein the signal transfer pad is configured to transfer the first image signal or the second image signal from the image signal supply means to the signal transfer section, and wherein the signal transfer section is configured to be coupled with the signal transfer pad to receive the first image signal or the second image signal when the second active matrix organic light emitting display panel is pulled substantially outside of the housing, and to be decoupled from the signal transfer pad when the second active matrix organic light emitting display panel is inside the housing.

17. A dual-screen display device comprising:

image signal supply means for supplying a first image signal and a second image signal;

a first active matrix organic light emitting display panel for displaying the first image signal;

a housing for mounting the first active matrix organic light emitting display panel;

a second active matrix organic light emitting display panel adapted to be inserted in and pulled out from the housing through at least two of right, left, and top sides of the housing, the second active matrix organic light emitting display panel for displaying at least one of the first image signal or the second image signal;

moving means for moving the second active matrix organic light emitting display panel outside of the housing; and fixing means for fixing the second active matrix organic light emitting display panel when the second active matrix organic light emitting display panel is moved outside of the housing.

18. The dual-screen display device of claim 17, wherein the housing comprises a signal transfer section configured to be decoupled from a signal transfer pad of the second active matrix organic light emitting display panel when the second active matrix organic light emitting display panel is inside the housing, and to be coupled with the signal transfer pad when the second active matrix organic light emitting display panel is substantially outside of the housing.

* * * * *